May 16, 1944.  A. G. C. KIRCHHEIM  2,348,823
PROCESS FOR MANUFACTURING GLASS ARTICLES
Filed May 26, 1939  2 Sheets-Sheet 1
Fig. 1.  Fig. 2.  Fig. 3.  Fig. 4.
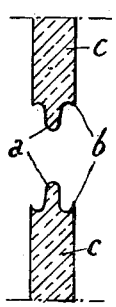 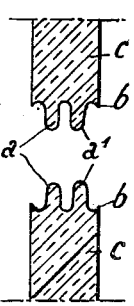 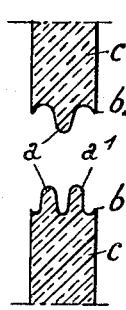 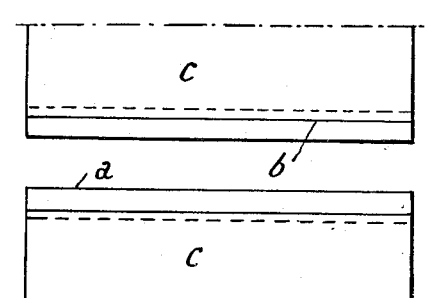
Fig. 5.  Fig. 6.  Fig. 7.
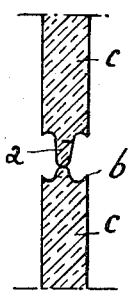 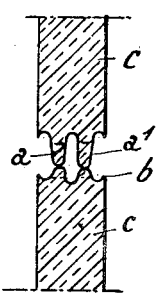 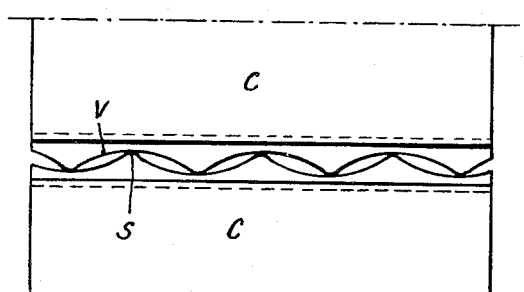
Fig. 8.  Fig. 9.  Fig. 10.
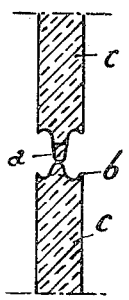 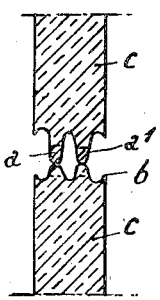 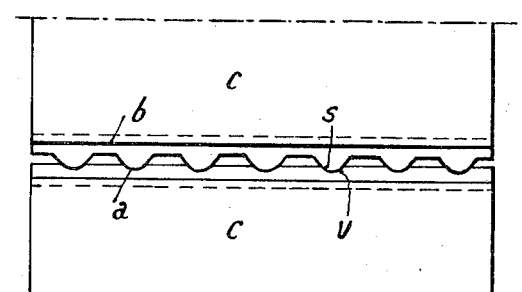
Inventor
Andre G. C. Kirchheim
By Dorsey Cole & Garner
Attorneys

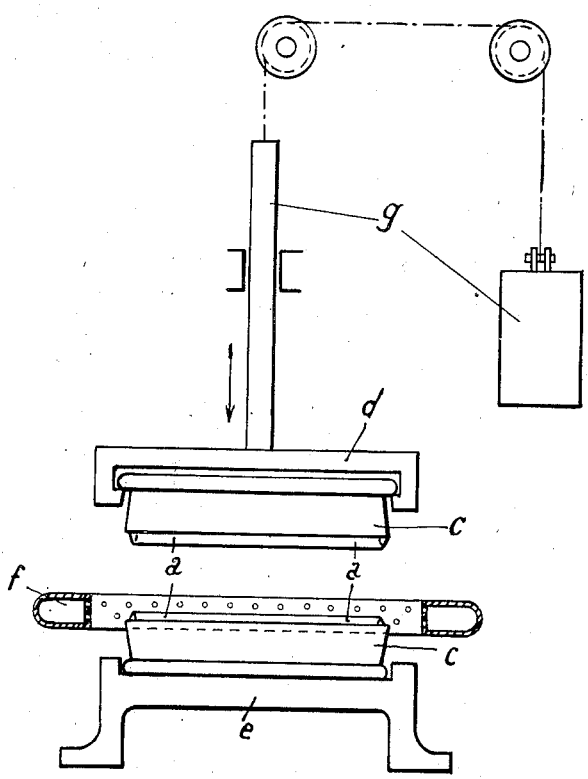

Patented May 16, 1944

UNITED STATES PATENT OFFICE 2,348,823

2,348,823

PROCESS FOR MANUFACTURING GLASS ARTICLES

André Georges Charles Kirchheim, Aix la Chapelle, Germany; vested in the Alien Property Custodian Application May 26, 1939, Serial No. 275,989
In Germany June 3, 1938

3 Claims. (Cl. 49—82)

The invention relates to the manufacture of hollow glass articles formed by assembling a plurality of elements.

The known process for the manufacture of such hollow glass articles consists in raising the elements to be assembled, or at any rate the parts of same located near the surfaces which are intended to come into contact, to a temperature at which the glass is capable of becoming welded to itself, and then pressing said elements against each other.

The carrying out in practice of this known process has hitherto encountered certain difficulties owing to the deformations which are detrimental to the article and which are liable to occur in the parts to be welded, either due to the pressure to be exerted on said elements for assembling same, or again to the high temperature which is almost the softening point of the glass and to which the elements have to be raised, at least in some of their parts. The efficiency of these processes may therefore be limited both by the necessity of not exerting too high a pressure and of not raising the parts to too high a temperature.

Consequently, there is a risk of the weld between the assembled elements not being perfectly fluid-tight, in particular when the contacting surfaces are of irregular shape or are unevenly faced.

The present invention has precisely for its object a process for manufacturing hollow glass articles, whereby a faultless weld of the assembled elements is obtained while eliminating the risks of deforming same during the assembling operation.

The process according to the invention consists in providing the surfaces of the glass elements which are intended to come into contact, with ribs, ridges or reliefs which are of such a shape and are so arranged that, at the instant when the elements come into contact, the projection of the surface of contact on a plane perpendicular to the direction of the movement of approach of the elements towards each other, is of smaller area than the area of the section of the elements through a plane parallel to the former but passing behind the ribs.

Owing to this particular configuration of the elements, when a force is exerted on same to press them against each other for assembling them, the pressure per unit area on the ribs or the like, at the instant when same come into contact, is greater than the pressure in the other sections which are located behind said ribs and are taken, in said elements, through planes that are perpendicular to the direction of the force exerted.

It follows from this that it is possible to calculate the pressure to be exerted and the temperature of the glass elements, in the immediate vicinity of the softening point, in such a manner as only to deform the ribs practically without deforming the elements to be assembled themselves.

Owing to this deformation of the ribs, it is possible to obtain an intimate contact between the elements to be assembled, in spite of the possible irregularities of shape of the contacting surfaces of said elements and thus to effect a fluid-tight weld of the elements to each other.

It has already been proposed to provide the contacting surfaces of the elements to be assembled, with ridges or with ribs, so as to prevent the slipping of one of the elements relatively to the other during the assembling operation, but in all these attempts, the projection of the contacting surface of the elements on a plane perpendicular to the direction of the movement of approach of the elements towards each other was not less than the section of the elements through a plane parallel to the former but located behind the ribs, so that at the location of the ribs the unit pressure was not greater than in the other parts of the elements. Consequently, the risk of deforming the elements themselves could not be avoided, since the correct assembling required too high a pressure.

Another advantage of the pressure according to the invention rests in the fact that by subjecting the edges of the elements, after manufacture and cooling, to re-heating, the ribs are automatically raised to a higher temperature than that of the body of the element, this result being due to the fact that the ribs are of smaller mass than said body itself.

This circumstance favours the welding, since it intensifies the main effect obtained by the shape of the ribs, as same are readily deformed by the effect of the pressure, without the body of the elements being itself liable to become deformed.

In the scope of the present invention ,the ribs or other projecting parts, the dimensions of which are such that they only occupy a part of the width of the element surfaces that are intended to come into contact, may be of any shape. They may be limited by plane or curved surfaces; they may be provided with peaks or with grooves and be arranged in any direction relatively to the edges of the elements to be assembled.

They may also be arranged in such a manner as to be located opposite each other when the elements are in contact, or again in such a manner that the ribs of one of the elements penetrate into the spaces left between the ribs of the other element. In numerous cases, it may suffice for only one of the surfaces which are intended to come into contact to be provided with ribs according to the invention.

It should be noted that, as in the prior assembling processes, the pressing of the elements to be assembled, against one another, may be obtained either by means of the actual weight of one of the elements, increased or not by an additional vertical pressure, or by means of a pressure exerted in any other appropriate direction, according to the position of the elements.

It should also be noted that when the ribs have to be ground to eliminate unevenness of shape or of surface, they only require a proportionally very small amount of work, owing to the fact that their cross-section is small relatively to the body of the elements to be assembled.

On the other hand, an advantageous method of carrying out the process consists, according to the invention, in effecting the heating of the two edges to be assembled, while same are in contact with each other and maintaining said heating while the assembling pressure is being exerted on the elements. Under these conditions, the heat required for raising the ribs to softening point penetrates inside the cavity of the article being formed and prevents the outer air from entering said cavity, thereby producing a very high vacuum inside the finished article.

The accompanying drawings give a diagrammatical illustration of the characteristic process which has just been defined.

In said drawings:

Figs. 1, 2, 3 show, in section taken perpendicular to the general direction of the ribs, two partial views of elements to be assembled provided with ribs, the arrangement of which varies from one figure to the other.

Fig. 4 shows a partial front view of said elements.

In these figures, the ribs are placed in position for assembling, but before contact.

Figs. 5 and 6 show two modifications, likewise in section, the ribs being in this case brought into contact for assembling the elements.

Fig. 7 is a front view corresponding to Figs. 5 or 6.

Figs. 8 and 9 show two other modifications, the ribs being brought into contact for assembling.

Fig. 10 is a front view corresponding to Figs. 8 and 9.

Fig. 11 is a front view with certain parts in section of an apparatus for assembling the hollow elements.

In all these figures, the ribs are designated by $a$, $a^1$, the edges of the elements by $b$ and the bodies of the elements by $c$.

In Figs. 1 to 4, the ribs $a$ or $a^1$ are straight.

Fig. 1 shows a single rib $a$ on each of the edges $b$.

Fig. 2 shows two ribs $a$—$a^1$ per edge.

Fig. 3 shows one rib $a$ on the edge of the upper element and two ribs $a$—$a^1$ on the edge of the lower element.

In the examples of Figs. 5 to 10, the ribs are of undulated or serrated longitudinal cross-section, the peaks $s$ of one of them coming into contact with the bottoms $v$ of the other.

In the device shown in Fig. 11 for welding the elements, the supports for each of the elements are designated by $d$ and $e$, the elements by $c$, the burner by $f$ and the device which enables the elements to be moved towards each other by $g$.

In the case of the manufacture of a hollow article formed by two elements, the same, after their manufacture and while they are still hot, are respectively mounted, as far as possible at the same time, in the supporting devices $d$ and $e$. The ribs of the upper element and of the lower element are subjected to a short heating exerted in the present case by means of a burner $f$.

Owing to their relatively small thickness the ribs $a$, on which the heating action is concentrated, are raised to the softening temperature sufficiently quickly for the elements $c$ themselves not to be influenced by said heating. When the ribs $a$ have been made plastic, the elements $c$ are moved towards each other by means of the sliding device $g$, in such a manner that they are brought into contact and welded by the action of a relatively small force, since although small said force suffices to develop a heavy pressure at the ribs.

When this assembling operation is effected on elements provided with a system of ribs which are not straight, of the kind of those shown in Figs. 5 to 10, the serrated or undulated edges of said ribs finally fit into each other owing to the deformation of the ribs, to such an extent that, in the finished article, the actual shape of the ribs can no longer be detected.

The finished hollow articles are then annealed or tempered according to the known methods.

As already pointed out at the outset, the heating can be maintained throughout the entire period during which the elements are placed in contact and pressed against each other. Under these conditions, at the beginning of the operation, as fluid-tightness is not obtained, hot gases penetrate inside the body which is being prepared; as soon as fluid-tightness becomes perfect, the internal atmosphere which has just been raised to a high temperature, is very rarefied, this advantageous result being to a large extent a direct consequence of the possibility of using very quick-acting burners, owing to the special configuration of the elements subjected to the heating.

What I claim is:

1. The method of fabricating a glass or vitreous building block or similar article which comprises fashioning at least two bodies having walls defined by opposite surfaces terminating in edges having ribs of reduced cross-sectional area relative to the cross-sectional areas of the walls displaced from said edges, said ribs lying substantially equidistantly between the planes of the opposite surfaces of the respective walls, and welding the edges of said bodies together by the application of heat and pressure.

2. The method of uniting two glass bodies which comprises fashioning the two bodies with walls defined by opposite surfaces terminating in edges having ribs of reduced cross-sectional area relative to the cross-sectional areas of the walls displaced from said edges, said ribs lying substantially symmetrically between the planes of the opposite surfaces of the respective walls, and welding the edges of said bodies together by the application of heat and pressure.

3. The method according to claim 2 wherein the final welding step following the fashioning of the bodies by their forming and subsequent cooling comprises reheating the bodies until the edges with the ribs thereat are at the softening temperature while the other parts of the bodies remain at a temperature lower than the softening temperature.

ANDRÉ GEORGES CHARLES KIRCHHEIM.